United States Patent
Vollmar

(10) Patent No.: US 10,723,343 B2
(45) Date of Patent: Jul. 28, 2020

(54) METHOD FOR OPERATING A MOTOR VEHICLE, AND TRANSMISSION CONTROL UNIT

(71) Applicant: ZF Friedrichshafen AG, Friedrichshafen (DE)

(72) Inventor: Reinhard Vollmar, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 16 days.

(21) Appl. No.: 16/315,728

(22) PCT Filed: Jun. 8, 2017

(86) PCT No.: PCT/EP2017/063898
§ 371 (c)(1),
(2) Date: Jan. 7, 2019

(87) PCT Pub. No.: WO2018/007088
PCT Pub. Date: Jan. 11, 2018

(65) Prior Publication Data
US 2019/0299965 A1    Oct. 3, 2019

(30) Foreign Application Priority Data
Jul. 8, 2016    (DE) .......... 10 2016 212 522

(51) Int. Cl.
*B60W 10/11*    (2012.01)
*B60W 10/184*    (2012.01)
(Continued)

(52) U.S. Cl.
CPC .......... *B60W 10/11* (2013.01); *B60W 10/184* (2013.01); *B60W 30/18072* (2013.01);
(Continued)

(58) Field of Classification Search
None
See application file for complete search history.

(56) References Cited

U.S. PATENT DOCUMENTS

| | | | |
|---|---|---|---|
| 4,771,657 A | 9/1988 | Iwatsuki | |
| 6,496,771 B2* | 12/2002 | Hattori | B60K 31/0008 340/435 |

(Continued)

FOREIGN PATENT DOCUMENTS

| | | |
|---|---|---|
| DE | 10032114 A1 | 1/2002 |
| DE | 10160308 A1 | 7/2002 |

(Continued)

OTHER PUBLICATIONS

German Search Report DE102016212522.2 dated Oct. 16, 2017. (10 pages)

(Continued)

*Primary Examiner* — Dirk Wright
(74) *Attorney, Agent, or Firm* — Dority & Manning, P.A.

(57) ABSTRACT

A method for operating a motor vehicle having a drive unit (1), a transmission (2), and a driven end (3), where the transmission (2) is an automatic gearbox connected between the driven end (3) and the drive unit (1), and where the transmission (2) has a plurality of shift elements (4). The method includes implementing a downshift from an actual gear into a target gear in the transmission (2) originating from a coasting condition of the motor vehicle by disengaging at least one previously engaged shift element (4) and engaging at least one previously disengaged shift element (4). Additionally, the method includes applying a brake torque at the driven end (3) by a vehicle brake (5), the brake torque depending on the thrust torque present at the driven end (3) before implementing the downshift.

8 Claims, 1 Drawing Sheet

(51) Int. Cl.
*B60W 30/18* (2012.01)
*B60W 30/19* (2012.01)
*F16H 61/04* (2006.01)

(52) U.S. Cl.
CPC ......... *B60W 30/19* (2013.01); *F16H 61/0437* (2013.01); *B60W 2710/1005* (2013.01); *B60W 2710/182* (2013.01)

(56) References Cited

U.S. PATENT DOCUMENTS

| | | | | |
|---|---|---|---|---|
| 7,427,254 | B2* | 9/2008 | Iwatsuki | B60W 30/18136 477/92 |
| 7,469,178 | B2* | 12/2008 | Shiiba | B60W 30/18109 701/70 |
| 2005/0071071 | A1* | 3/2005 | Nagata | B60K 28/14 701/70 |
| 2005/0124458 | A1 | 6/2005 | Iwatsuki et al. | |

FOREIGN PATENT DOCUMENTS

| | | |
|---|---|---|
| DE | 102004058206 A1 | 7/2005 |
| DE | 102005021714 A1 | 11/2006 |
| WO | WO 02085661 A1 | 10/2002 |
| WO | WO 2006/119850 | 11/2006 |

OTHER PUBLICATIONS

International Search Report (English Translation) PCT/EP2017/063898, dated Sep. 7, 2017. (2 pages).

* cited by examiner

METHOD FOR OPERATING A MOTOR VEHICLE, AND TRANSMISSION CONTROL UNIT

FIELD OF THE INVENTION

The invention relates generally to a method for operating a motor vehicle. Moreover, the invention relates to a transmission control unit configured to carry out the method for operating a motor vehicle.

BACKGROUND

Motor vehicles having a drive unit, a driven end, and a transmission connected between the drive unit and the driven end have been known from practical experience for a long time. The operation of the drive unit is controlled by an engine control unit by an open-loop system and/or a closed-loop system. The operation of the transmission is controlled by a transmission control unit by an open-loop system and/or a closed-loop system.

A transmission is a gearbox having multiple shift elements. The shift elements are friction-locking shift elements, such as clutches and brakes, or are form-fit shift elements, such as shifting dogs. In order to implement a gear shift or a gear change in a gearbox, at least one previously engaged shift element is disengaged and at least one previously disengaged shift element is engaged in order to transfer the transmission from an actual gear into a target gear. In particular, for the case in which a form-fit shift element is the shift element to be engaged and, therefore connected, contributes to the implementation of a gear shift, the form-fit shift element must first be synchronized via an engagement of the drive unit. The shift element to be engaged is engageable only after an appropriate synchronization. Torque cannot be transmitted by the transmission during this time. In particular, for a downshift to be implemented originating from a coasting condition of the motor vehicle, the absence of the thrust torque at the driven end is perceived as unpleasant by the driver, since the braking effect of the drive unit is missing during the gear shift. For the case in which the driver intentionally initiates a downshift during downhill travel, for example, in an inching operation, the omission of the thrust torque from the drive unit at the driven end is perceived as particularly disadvantageous. The same applies for hybrid vehicles, in which, in the coasting condition, the thrust torque utilized for recuperation is relatively high.

There is a need, therefore, for a method for operating a motor vehicle, and for a transmission control unit, that allows downshifts to be implemented more comfortably originating from a coasting condition of the motor vehicle.

SUMMARY OF THE INVENTION

With the method of the invention, for a downshift from an actual gear into a target gear implemented in the transmission originating from a coasting condition of the motor vehicle, a brake torque is applied at the driven end via the vehicle brake of the motor vehicle. This brake torque applied by the vehicle brake depends on the thrust torque present at the driven end before implementation of the gear shift.

With the aid of the invention, the situation is avoided, in which a braking effect is no longer available at the driven end during the implementation of a downshift originating from a coasting condition. The engagement via the vehicle brake therefore compensates for the absence of the thrust torque from the drive unit at the driven end.

According to one embodiment of the invention, during implementation of the downshift, the vehicle brake applies a brake torque at the driven end, which is also dependent on a thrust torque present at the driven end in the target gear after implementation of the downshift. As a result, the engagement of the vehicle brake at the driven end is particularly advantageously configured via the brake torque.

According to one variant, the vehicle brake applies a brake torque at the driven end during implementation of the downshift with interruption of thrust torque, which simulates a thrust torque profile of a downshift without interruption of thrust torque at the driven end. According to this variant of the invention, a torque profile is simulated at the driven end with the aid of the brake, which corresponds to the thrust torque profile of a downshift without interruption of thrust torque.

According to one further variant, the vehicle brake applies a brake torque at the driven end, which proceeds in a ramp-like manner and, therefore, continuously and constantly, between the thrust torque present at the driven end in the actual gear before implementation of the downshift and the thrust torque present at the driven end in the target gear after implementation of the downshift. This variant of the invention is particularly preferred for providing a brake torque at the driven end via the vehicle brake.

During implementation of the downshift, either a form-fit shift element is engaged and, for this purpose, is synchronized by an engagement of the drive unit, or a friction-locking shift element is engaged and, for this purpose, is synchronized before the engagement by an engagement of the drive unit.

The method is usable when the shift element to be engaged is a form-fit shift element as well as when the shift element to be engaged is a friction-locking shift element. When the shift element to be engaged is a friction-locking shift element, the shift element to be engaged is engaged only after synchronization.

A transmission control unit may be configured to carry out the method of the invention.

BRIEF DESCRIPTION OF THE DRAWINGS

Preferred refinements result from the dependent claims and the following description. Exemplary embodiments of the invention are explained in greater detail with reference to the drawings, without being limited thereto. In the drawings, the following is shown:

DETAILED DESCRIPTION

Figure 1:
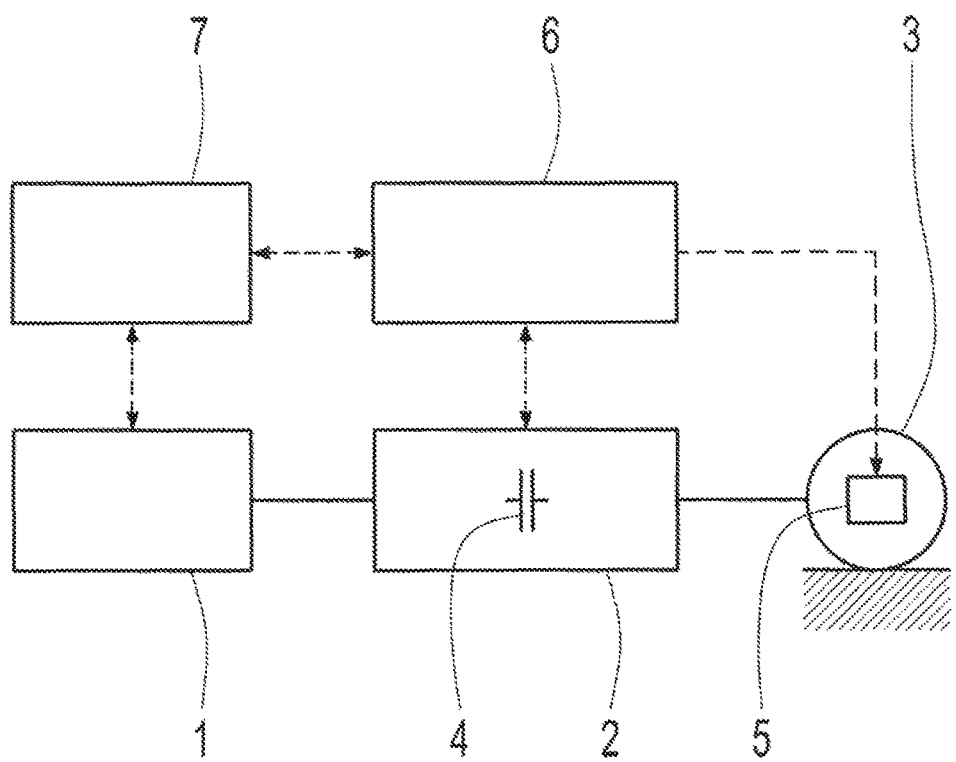
FIG. 1 illustrates a schematic view of a drive train of a motor vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The invention relates to a method for operating a motor vehicle and to a transmission control unit.

FIG. 1 shows a schematic view of a drive train of a motor vehicle, which has a drive unit 1, a transmission 2, and a driven end 3. The transmission 2 is an automatic gearbox having a plurality of shift elements 4, wherein FIG. 1 shows one such shift element 4 for example. The transmission 2 is connected between the drive unit 1 and the driven end 3, and converts rotational speeds and torques and provides the available tractive force of the drive unit 1 at the driven end 3. Moreover, FIG. 1 shows a motor vehicle brake 5, via which a brake torque is applied at the driven end 3. The operation of the transmission 2 is controlled by a transmission control unit 6 by an open-loop system and/or a closed-loop system, for the transmission control unit 6 to exchange data with the transmission 2. The operation of the drive unit 1 is controlled by an engine control unit 7 by an open-loop system and/or a closed-loop system, for the engine control unit 7 to exchange data with the drive unit 1. Moreover, the transmission control unit 6 and the engine control unit 7 exchange data with one another.

For a gear to be engaged in the transmission 2, where the transmission 2 is a gearbox, a first defined number of shift elements 4 is engaged and a second defined number of shift elements 4 is disengaged. In order to implement a gear change, and therefore a gear shift in the transmission 2, at least one previously engaged shift element 4 is disengaged and at least one previously disengaged shift element 4 is engaged. Upshifts as well as downshifts are carried out as gear shifts in this case and originate from a coasting condition of the motor vehicle and even originate from a traction operation of the motor vehicle. The present invention relates to details of a method for operating a motor vehicle, in which a downshift from an actual gear into a target gear is implemented in the transmission 2 originating from a coasting condition of the motor vehicle, wherein the shift element of the transmission 2 to be engaged and, therefore, connected, is engaged only after conclusion of the synchronization, so no thrust torque of the drive unit 1 is transmittable by the transmission 2 in the direction of the driven end 3 during the actual implementation of the gear shift and, therefore, no thrust torque from the drive unit is present at the driven end 3.

With the aid of the invention, for a downshift from an actual gear into a target gear to be implemented in the transmission 2 originating from a coasting condition of the motor vehicle, where the shift element 4 to be engaged to implement the gear shift is engaged only after synchronization has taken place, a brake torque is applied at the driven end 3 via the vehicle brake 5, which depends on the thrust torque present at the driven end 3 before implementation of the downshift.

Therefore, a thrust torque of the drive unit 1 is at least partially compensated for by the vehicle brake 5 of the motor vehicle to make an appropriate braking effect available at the driven end 3 even when the transmission 2 cannot transmit any thrust torque in the direction of the driven end 3 during implementation of the downshift.

The brake torque applied by the vehicle brake 5 at the driven end 3 during implementation of the downshift preferably depends on the thrust torque present at the driven end 3 in the actual gear before implementation of the downshift and, additionally, on the thrust torque present at the driven end 3 in the target gear after implementation of the downshift.

Figure 2:
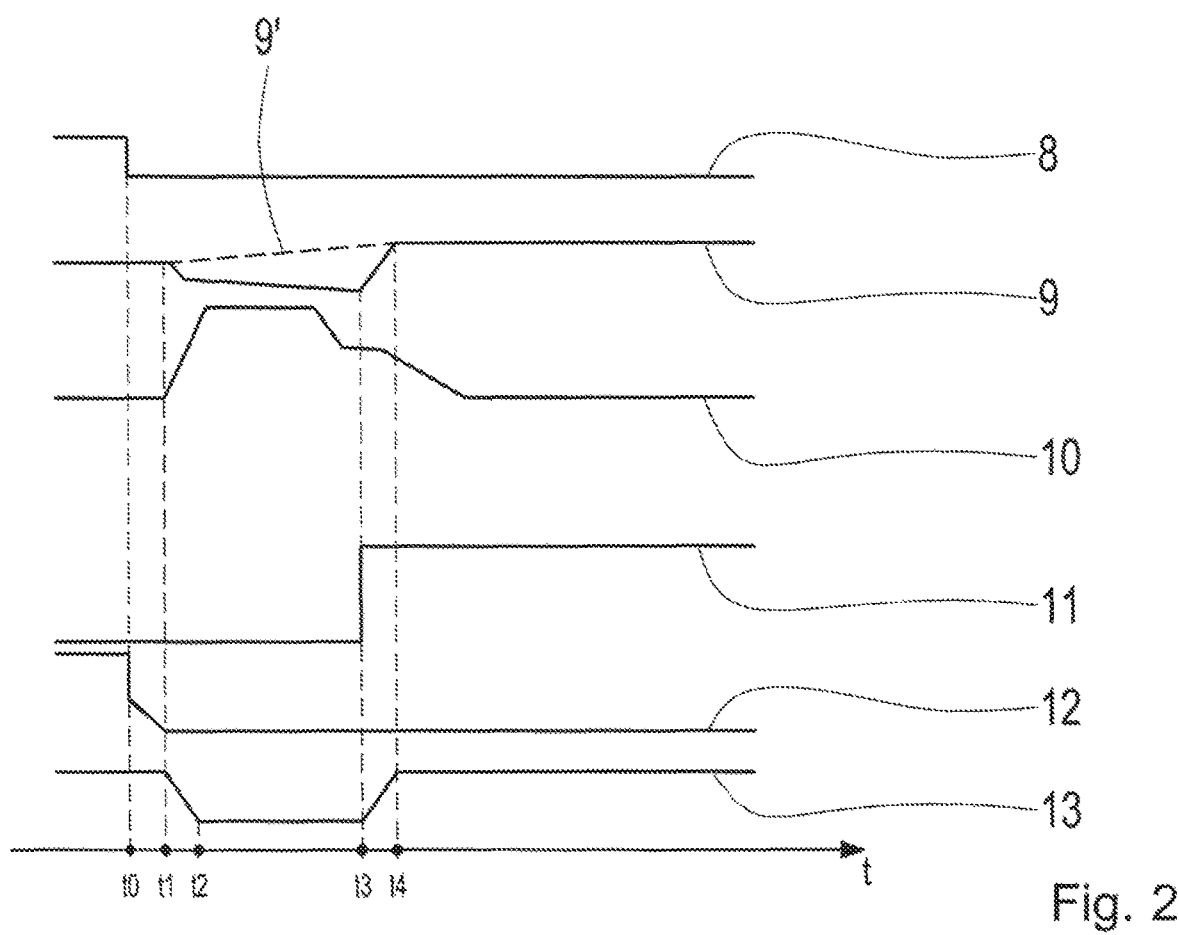
FIG. 2 illustrates a shifting operation of the method for operating a motor vehicle.

Further details of the invention are described with reference to FIG. 2, wherein multiple curves over time t are shown in FIG. 2. The curve 8 demonstrates an example of a shift request. The curve 9 demonstrates an example of the torque present at the driven end 3. The curve 10 demonstrates an example of a torque profile of the drive unit 1. The curve 11 demonstrates an example of the activation of a shift element 4 to be engaged for the gear change. The curve 12 demonstrates an example of the activation of a shift element 4 to be disengaged for the implementation of the gear shift. The curve 13 demonstrates an example of the brake engagement of the vehicle brake 5.

In FIG. 2, an actual gear is engaged in the transmission 2 before the point in time t0, wherein the motor vehicle is operated in the coasting condition. Before the point in time t0, a thrust torque is therefore present at the driven end 3 according to the curve 9.

At the point in time t0, according to the curve 8, a control-side request for a gear shift or a gear change takes place, wherein, beginning at the point in time t0, the shift element 4 to be disengaged for the implementation of the gear shift from the actual gear into the target gear is disengaged. According to the curve 12, at the point in time t0, the pressure control for this shift element 4 to be disengaged is initially reduced in a stepped manner and, thereafter, in a ramp-like manner between the points in time t0 and t1.

Beginning at the point in time t1, according to the curve 10, a synchronization of the shift element 4 to be engaged for the gear shift to be implemented takes place via an appropriate engagement of the drive unit 1. This shift element 4 is, in particular, a form-fit shift element, such as a shifting dog. Since the shift element 4 to be synchronized for the gear shift to be implemented is completely disengaged during the synchronization and no torque is transmitted in the direction of the driven end 3, then, according to the invention, an appropriate activation of the vehicle brake 5 takes place, according to the curve 13, in order to apply a brake torque at the driven end 3 via the vehicle brake 5. Beginning at the point in time t1, the brake torque made available at the driven end by the vehicle brake 5 is initially decreased in a ramp-like manner up to the point in time t2. The brake torque remains constant between the points in time t2 and t3 and, after the synchronization of the shift element 4 to be engaged has taken place, the brake torque is increased once again, in a ramp-like manner, between the points in time t3 and t4.

Between the points in time t1 and t3, the synchronization of the shift element 4 to be engaged for the implementation of the gear shift therefore takes place, wherein this synchronization is completed at the point in time t3, and so, according to the curve 11, the shift element 4 to be engaged is actually engaged at the point in time t3.

During the implementation of the downshift in the transmission 2, a brake torque is therefore applied by the vehicle brake 5 at the driven end 3. This brake torque is dependent, at least, on the thrust torque present in the actual gear at the driven end 3 before implementation of the downshift and preferably also on the thrust torque present in the target gear at the driven end 3 after implementation of the downshift.

By way of the solid line in FIG. 2, the curve 9 shows a torque present at the driven end 3, which simulates a thrust torque profile at the driven end 3 by making a brake torque available at the driven end 3 with the aid of an appropriate engagement of the service brake 5 during implementation of the downshift with interruption of thrust torque. The thrust torque profile corresponds to a downshift without interruption of thrust torque, as would occur during conventional utilization of a friction-locking shift element to be connected. In contrast, the dashed line in FIG. 2 shows a curve 9' which is characterized in that the vehicle brake 5 applies a brake torque at the driven end 3 such that the output torque proceeds in a ramp-like manner and, therefore, continuously and constantly, between the thrust torque present in the actual gear at the driven end 3 before implementation of the downshift and the thrust torque present in the target gear at the driven end 3 after implementation of the downshift.

Via the engagement of the vehicle brake or the service brake 5, the torque present at the driven end 3 is therefore transferred, in a defined manner, during the implementation of the gear shift, from the thrust torque present in the actual gear at the driven end 3 before implementation of the downshift into the thrust torque present in the future in the target gear at the driven end 3 after implementation of the downshift. The thrust torque present in the future in the target gear at the driven end 3 is calculated depending on the thrust torque present in the actual gear at the driven end 3 and depending on the ratios of the actual gear and the target gear.

Particularly preferably, the invention is utilized when a form-fit shift element, as the shift element 4 to be connected and engaged, is to be synchronized in advance during the implementation of the gear shift or the gear change in the transmission 2.

The invention is also usable, however, when the shift element 4 to be connected and engaged is a friction-locking shift element, which is actually engaged only after synchronization has taken place.

With the aid of the invention, a torque profile or a brake torque is made available at the driven end via an appropriate engagement of the service brake 5, which compensates for or simulates the thrust torque of the drive unit 1, which is no longer be transmitted by the transmission 2 to the driven end 3. As a result, the comfort of the gear shift implementation is enhanced.

Particularly advantageously, the invention is also usable in motor vehicles whose drive unit 1 is a hybrid drive having an internal combustion engine and an electric machine.

In these types of hybrid vehicles, a recuperation takes place in the coasting condition, whereby the thrust torque present at the driven end 3 before implementation of the downshift is typically relatively high. Therefore, the absence of the thrust torque at the driven end 3 is very noticeable. In this case, a brake torque is made available at the driven end 3 via an appropriate engagement of the service brake 5, which at least partially compensates for the absence of the thrust torque from the drive unit at the driven end 3.

The invention also relates to a transmission control unit 6 for carrying out the method. During a gear shift implementation, the transmission control unit 6 activates the shift elements 4 of the transmission 2, namely the shift elements contributing to the implementation of the gear shift, to engage or to disengage. For the case, originating from a coasting condition of the motor vehicle, in which a downshift from an actual gear into a target gear is implemented in the transmission 2, which requires a synchronization of the shift element 4 to be connected and engaged before the shift element 4 is engaged, the vehicle brake 5 is activated by the transmission control unit 6 and such that the vehicle brake 5 applies a brake torque at the driven end 3, which is dependent at least on the thrust torque present at the driven end 3 before the implementation of the downshift and preferably also on the thrust torque present in the target gear at the driven end 3 after implementation of the downshift.

In order to carry out the method, the transmission control unit 6 includes appropriate means, wherein the means are hardware-side means and software-side means in this case. The hardware-side means are data interfaces for exchanging data with the assemblies contributing to the implementation of the method according to the invention, such as with the vehicle brake 5. Moreover, these hardware-side means are a processor for data processing and a memory for data storage. The software-side means include program components for carrying out the method according to the invention.

Modifications and variations can be made to the embodiments illustrated or described herein without departing from the scope and spirit of the invention as set forth in the appended claims.

REFERENCE CHARACTERS

1 drive unit
2 transmission
3 driven end
4 shift element
5 vehicle brake
6 transmission control unit
7 engine control unit
8 shape of the curve for shift request
9 shape of the curve for torque at the driven end
10 shape of the curve for torque of drive unit
11 shape of the curve for activation of shift element to be engaged
12 shape of the curve for activation of shift element to be disengaged
13 shape of the curve for brake engagement

The invention claimed is:

1. A method for operating a motor vehicle having a drive unit (1), a transmission (2), and a driven end (3), wherein the transmission (2) is an automatic gearbox connected between the driven end (3) and the drive unit (1), the transmission (2) having a plurality of shift elements (4), the method comprising:
   from a coasting condition of the motor vehicle, implementing a downshift from an actual gear ratio into a target gear ratio in the transmission (2) by disengaging at least one previously engaged shift element (4) and engaging at least one previously disengaged shift element (4); and
   applying a brake torque at the driven end (3) with a vehicle brake (5), the brake torque applied with the vehicle brake (5) depending on the thrust torque present at the driven end (3) before implementing the downshift.

2. The method of claim 1, wherein the vehicle brake (5) applies the brake torque while implementing the downshift, and the brake torque is also dependent on a thrust torque present at the driven end (3) in the target gear ratio after implementation of the downshift.

3. The method of claim 1, wherein implementing the downshift comprises implementing the downshift with interruption of thrust torque, and the vehicle brake (5) applies the brake torque to simulate a thrust torque profile of a downshift without interruption of thrust torque at the driven end (3).

4. The method of claim 1, wherein the vehicle brake (5) applies the brake torque in a ramp-like manner between the thrust torque present at the driven end (3) in the actual gear ratio before implementing the downshift and the thrust torque present at the driven end (3) in the target gear ratio after implementing the downshift.

5. The method of claim 1, further comprising:
   synchronizing a form-fit shift element of the transmission (2) by an engagement of the drive unit while implementing the downshift; and engaging the form-fit shift element of the transmission (2) while implementing the downshift.

6. The method of claim 1, further comprising:

synchronizing a friction-locking shift element of the transmission (2) by an engagement of the drive unit while implementing the downshift; and engaging the friction-locking shift element of the transmission (2) after synchronizing the friction-locking shift element and while implementing the downshift.

7. A transmission control unit (6) for operating a transmission of a motor vehicle, wherein the transmission is an automatic gearbox, the transmission control unit being configured to:

implement a downshift from an actual gear ratio into a target gear ratio in the transmission (2) originating from a coasting condition of the motor vehicle by disengaging at least one previously engaged shift element (4) and engaging at least one previously disengaged shift element (4); and activate a vehicle brake (5) such that the vehicle brake (5) applies a brake torque at the driven end (3), the brake torque applied by the vehicle brake (5) depending on the thrust torque present at the driven end (3) before implementing the downshift.

8. A transmission control unit (6), comprising a control side configured to carry out the method of claim 1.

\* \* \* \* \*